United States Patent [19]

Pavilcius et al.

[11] 4,141,854

[45] Feb. 27, 1979

[54] EMULSION BREAKING

[75] Inventors: Audrone M. Pavilcius, Chicago; Mary Ann Latko, Summit, both of Ill.

[73] Assignee: Nalco Chemical Company, Oak Brook, Ill.

[21] Appl. No.: 860,542

[22] Filed: Dec. 14, 1977

Related U.S. Application Data

[63] Continuation-in-part of Ser. No. 801,894, May 31, 1977, abandoned.

[51] Int. Cl.$^2$ .................... G21F 9/04; B01D 17/04
[52] U.S. Cl. .................... 252/301.1 W; 252/344; 252/358; 423/9; 423/10; 423/253
[58] Field of Search ............... 252/301.1 W, 344, 358; 423/9, 10, 253

[56] References Cited

U.S. PATENT DOCUMENTS

| | | | |
|---|---|---|---|
| 2,937,143 | 5/1960 | Goren | 252/358 |
| 3,090,759 | 5/1963 | Jenkins | 252/344 |
| 3,115,388 | 12/1963 | Goren | 423/253 |
| 3,316,181 | 4/1967 | Sackis | 252/344 |
| 3,691,086 | 9/1972 | Lees et al. | 252/344 |

*Primary Examiner*—Benjamin R. Padgett
*Assistant Examiner*—Deborah L. Kyle
*Attorney, Agent, or Firm*—John G. Premo; Robert A. Miller

[57] ABSTRACT

A method of resolving water-in-oil emulsions resulting from the organic solvent extraction of uranium from aqueous leach liquors which comprises treating said emulsions with at least 20 parts per million of a water-soluble acrylamide copolymer which contains from 5 – 50% by weight of a lower alkyl substituted tertiary aminoethyl methacrylate and quaternary ammonium salts thereof.

2 Claims, No Drawings

EMULSION BREAKING

This is a continuation-in-part of copending application Ser. No. 801,894, filed May 31, 1977.

INTRODUCTION

Uranium is normally recovered from uranium-bearing ores by first extracting the uranium with aqueous solutions of either acid or alkali. Sulfuric acid extraction is the most common. This extraction produces a leach liquor which is then further treated to remove and concentrate the uranium values. One method of extracting uranium from its leach liquor relies on the use of organic solvents which contain as the extractant or complexing agent organic phosphoric acids or fatty substituted amines, particularly fatty substituted tertiary amines. These extractants are usually dissolved in a light hydrocarbon liquid such as kerosene. In many instances, other organic liquids which act as cosolvents are used. After the uranium leach liquors are contacted with the solvents containing the organic extracting agent, the uranium is displaced to the organic phase which is treated with either water to precipitate the uranium or the solvent is evaporated.

For additional details with respect to the above described process, see the Encyclopedia of Chemical Technology, Second Edition, Vol. 21, Interscience, 1970.

These solvent extraction systems are continuously reused. This causes the formation of small amounts of extremely tight water-in-oil emulsions. These emulsions are removed from the system and heretofore have been disposed of by conventional means. The amount of valuable organic component in the emulsions is substantial and is lost when the emulsions are discarded.

In an attempt to recover the organic portion of these emulsions, many conventional emulsion breaking agents have been tested with little or no success. If it were possible to resolve these emulsions whereby the organic phase could be recovered and returned to the uranium recovery process for reuse, an economy would be afforded. Similarly, if these emulsions can be resolved, then a less polluting byproduct could be afforded which could be disposed of more efficently and with less harm to the environment.

THE INVENTION

In accordance with the invention, it has been found that water-in-oil emulsions resulting from the organic solvent extraction of uranium from aqueous leach liquors may be broken by treating these emulsions with at least 20 ppm of a water-soluble acrylamide copolymer which contains from 5–50% by weight of a lower alkyl substituted tertiary aminoethyl methacrylate. In addition to using the tertiary amino acrylates, their quaternary ammonium salts may also be used. These copolymers are effective in resolving emulsions of the above type at dosages ranging from as little as 20 ppm up to as much as 200–400 ppm. The particular dosage must be determined by using routine laboratory experiments. The dosage is based on the total volume of the emulsion.

The Acrylamide Copolymers

The acrylamide copolymer used in the practice of the invention contains acrylamide which has been copolymerized with from 5–50% by weight and, preferably, 25–40% by weight of an amino methacrylate having the structural formula:

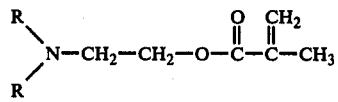

In the above formula, R is a lower aliphatic hydrocarbon radical which contains from 1–4 carbon atoms. A preferred comonomer is dimethylaminoethylmethacrylate (hereafter referred to a DMAEM). These monomers are described in U.S. Pat. No. 2,138,763. The molecular weight of these copolymers should be at least 50,000 and, preferably, greater than 500,000, and, in most cases, would be 1,000,000 or more.

These copolymers are conveniently prepared in the form of a water-in-oil emulsion which may be inverted in water in the presence of a surfactant to produce rapid solutions of the copolymer. This type of emulsion and its method of inversion is set forth in U.S. Pat. No. Re. 28,474. The method of preparing these copolymer emulsions is described in this patent as well as U.S. Pat. No. 3,284,393. The disclosures of these patents are set forth herein by incorporation.

A typical copolymer emulsion used in the practice of the invention contains approximately 40% by weight of water, 32% by weight of polymer, the balance a paraffinic mineral oil such as ISOPAR M[1]. The particular copolymer would be composed of acrylamide and 11.5% DMAEM. This copolymer would be prepared in accordance with the preparative examples set forth in U.S. Pat. No. 3,284,393. It is important that these copolymers, when used to resolve the emulsions, be completely dispersed into the emulsion being treated and be in contact with the emulsion for periods of time ranging between 1–24 hours at temperatures ranging from room temperature to about the boiling point of the emulsion. Better results are obtained when the emulsion being treated is heated above 100° F. but below the boiling point of the emulsion.
[1]See U.S. Pat. No. Re. 28,474.

To illustrate the advantages of the invention, the following is presented by way of example:

A sample of a uranium solvent extraction emulsion was obtained. The organic portion of the emulsion contained approximately 94% kerosene, 3% fatty amine, and 3% of isodecanol which is a cosolvent for the amine. The nonorganic portion of the emulsion was a mixture of fine clays, aluminates, diatomaceous earth filter media and other inorganic components such as molybdates.

A small sample of the emulsion was placed into graduated beakers. These graduated beakers were treated with amounts of a dilute aqueous solution of the specific copolymer emulsion described above in dosages ranging between 20–400 ppm. After mixing of the copolymer into the emulsion to be broken, the emulsion containing the polymer was heated to 120° F. and stirred for two hours. Agitation was very gentle throughout the entire period. At the end of that time, good resolution of the emulsion was obtained, e.g. 24% oil, 26% water, 30% solids, and 20% rag.

Similar tests were run under identical conditions using the following commercial emulsion breakers, none of which had any effect in resolving the above described emulsion: an ethoxylated phenol-formaldehyde resin; an epoxy resin and polyoxyalkylene glycol blend; an ethoxylated alkyl substituted phenol.

Having thus described our invention, it is claimed as follows:

1. A method of resolving water-in-oil emulsions resulting from the organic solvent extraction of uranium from aqueous leach liquors which comprises treating said emulsions at a temperature between room temperature and the boiling point of the emulsions with at least 20 parts per million of a water-soluble acrylamide copolymer which contains from 5–50% by weight of a lower alkyl substituted tertiary aminoethyl methacrylate and quaternary ammonium salts thereof.

2. The method of claim 1 wherein the organic solvent comprises an organic hydrocarbon liquid which contains a fatty substituted amine and the lower alkyl substituted tertiary aminoethyl methacrylate is dimethylaminoethylmethacrylate which is used at a dosage ranging from 20–400 ppm.

* * * * *